United States Patent
Su et al.

(10) Patent No.: US 12,025,588 B2
(45) Date of Patent: Jul. 2, 2024

(54) MICROELECTROMECHANICAL SENSING APPARATUS WITH CALIBRATION FUNCTION

(71) Applicant: INDUSTRIAL TECHNOLOGY RESEARCH INSTITUTE, Hsinchu (TW)

(72) Inventors: Chung-Yuan Su, Tainan (TW); Chin-Fu Kuo, Tainan (TW); Liang-Ying Liu, Zhubei (TW); Chao-Ta Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 441 days.

(21) Appl. No.: 17/539,686

(22) Filed: Dec. 1, 2021

(65) Prior Publication Data
US 2022/0365040 A1 Nov. 17, 2022

(30) Foreign Application Priority Data
Apr. 29, 2021 (TW) ................... 110115515

(51) Int. Cl.
*G01C 19/56* (2012.01)
*G01C 25/00* (2006.01)
(Continued)

(52) U.S. Cl.
CPC ............ *G01N 29/30* (2013.01); *G01C 19/56* (2013.01); *G01C 25/00* (2013.01); *G01N 29/24* (2013.01)

(58) Field of Classification Search
CPC .. G01N 29/30; G01N 29/24; G01N 2291/014; G01C 19/56; G01C 25/00
See application file for complete search history.

(56) References Cited

U.S. PATENT DOCUMENTS

| 9,410,806 B2 | 8/2016 | Ezekwe |
| 9,702,897 B2 | 7/2017 | Stewart |

(Continued)

FOREIGN PATENT DOCUMENTS

| CN | 103890593 | 6/2014 |
| CN | 107367271 B | 11/2017 |

(Continued)

OTHER PUBLICATIONS

Ren et al., "A Novel Self-Calibration Method for MIMU" IEEE Sensors Journal, vol. 15, No. 10, Oct. 2015.
(Continued)

*Primary Examiner* — Xin Y Zhong
(74) *Attorney, Agent, or Firm* — Maschoff Brennan (57) ABSTRACT

A microelectromechanical sensing apparatus with calibration function comprises a microelectromechanical sensor and an IC chip. The microelectromechanical sensor comprises a proof mass, a movable driving electrode and a movable sensing electrode disposed on the proof mass, and a stationary driving electrode and stationary sensing electrode disposed on a substrate, wherein the sensing electrodes output a sensing signal when the proof mass vibrates. The IC chip comprises a conversion module electrically connected to the microelectromechanical sensor, wherein the conversion module converts the sensing signal into an input spectrum signal, and a calibration module electrically connected to the conversion module, wherein the calibration module receives the input spectrum signal and transforms the input spectrum signal into an output spectrum signal; wherein the output spectrum signal is equal amplitude spectrum signal when the microelectromechanical sensor is subjected to an equal amplitude vibration and the input spectrum signal is an unequal amplitude spectrum signal.

18 Claims, 7 Drawing Sheets

(51) Int. Cl.
    *G01N 29/24*         (2006.01)
    *G01N 29/30*         (2006.01)

(56)                 References Cited

U.S. PATENT DOCUMENTS

| | | | |
|---|---|---|---|
| 9,874,581 | B2 | 1/2018 | Tin |
| 2004/0088127 | A1* | 5/2004 | M'Closkey ............ G01C 19/56 702/96 |
| 2013/0268227 | A1* | 10/2013 | Opris ................. G01C 19/5726 702/104 |
| 2014/0245832 | A1 | 9/2014 | Lin et al. |
| 2019/0072635 | A1 | 3/2019 | Kang et al. |
| 2020/0408525 | A1* | 12/2020 | Fang ................... G01C 25/005 |

FOREIGN PATENT DOCUMENTS

| | | |
|---|---|---|
| TW | 201435305 A | 9/2014 |
| TW | 689708 B | 4/2020 |

OTHER PUBLICATIONS

Die et al., "Autocalibration Method of MEMS Accelerometer" Aug. 19-22, 2011.

D'Emilia et al., "Calibration of tri-axial MEMS accelerometers in the low-frequency range—Part 1: comparison among methods" J. Sens. Sens. Syst., 7, 245-257, 2018.

Glueck et al., "Real-Time Autocalibration of MEMS Accelerometers" IEEE Transactions on Instrumentation and Measurement, vol. 63, No. 1, Jan. 2014.

TW Office Action in Application No. 110115515 Dated Aug. 4, 2022.

\* cited by examiner

MICROELECTROMECHANICAL SENSING APPARATUS WITH CALIBRATION FUNCTION

CROSS-REFERENCE TO RELATED APPLICATIONS

This non-provisional application claims priority under 35 U.S.C. § 119(a) on Patent Application No(s). 110115515 filed in Republic of China (ROC) on Apr. 29, 2021, the entire contents of which are hereby incorporated by reference.

BACKGROUND

1. Technical Field

This disclosure relates to a microelectromechanical sensing apparatus with calibration function.

2. Related Art

When using a microelectromechanical sensor for sensing (for example, monitoring equipment in a production line), the microelectromechanical sensor is usually calibrated before and after leaving the factory as well as before on-line operation in order to accurately monitor the vibration of the equipment during on-line operation.

For example, a microelectromechanical sensor may generate an error result due to the manufacturing error of the sensor itself and the error in reading the electrical signal. Therefore, manufacturers always perform calibration on the microelectromechanical sensor before it leaves the factory. However, manufacturers usually perform calibration through disposing the microelectromechanical sensors one by one on the shaker, which leads to the increase in time consumed and labor costs just for the calibration.

In addition, after the microelectromechanical sensor has already left the factory and been in operation, the sensor may generate error results due to the aging of the material, changes in the temperature of the surrounding environment or the equipment being sensed generating multiple frequencies. Under this circumstance, the operation of the production line has to be paused in order to demount the sensor from the equipment to be further shipped back to the manufacturer for calibration. As a result, the production of the production line is significantly affected.

SUMMARY

Accordingly, this disclosure provides a microelectromechanical sensing apparatus with calibration function.

According to one or more embodiment of this disclosure, a microelectromechanical sensing apparatus with calibration function comprises: a microelectromechanical sensor, comprising: a proof mass, at least one movable driving electrode disposed on the proof mass, at least one stationary driving electrode disposed on a substrate, at least one movable sensing electrode disposed on the proof mass, and at least one stationary sensing electrode disposed on the substrate, wherein the at least one movable sensing electrode and the at least one stationary sensing electrode output a sensing signal when the proof mass vibrates; and an integrated circuit chip, comprising: a conversion module electrically connected to the microelectromechanical sensor, wherein the conversion module converts the sensing signal into an input spectrum signal, and a calibration module electrically connected to the conversion module, wherein the calibration module receives the input spectrum signal and transforms the input spectrum signal into an output spectrum signal; wherein, the output spectrum signal is an equal amplitude spectrum signal when the microelectromechanical sensor is subjected to an equal amplitude vibration and the input spectrum signal is an unequal amplitude spectrum signal.

According to one or more embodiment of this disclosure, a microelectromechanical sensing apparatus with calibration function, comprises: a microelectromechanical sensor, comprising: a proof mass, at least one movable driving electrode disposed on the proof mass, at least one stationary driving electrode disposed on a substrate, at least one movable sensing electrode disposed on the proof mass, and at least one stationary sensing electrode disposed on the substrate, wherein the at least one movable sensing electrode and the at least one stationary sensing electrode output a sensing signal when the proof mass vibrates; and an integrated circuit chip, comprising: a conversion module electrically connected to the microelectromechanical sensor, wherein the conversion module converts the sensing signal into an input spectrum signal, and a calibration module electrically connected to the conversion module and comprising a vibration signal generator, wherein the calibration module receives the input spectrum signal and transforms the input spectrum signal into an output spectrum signal, and the output spectrum signal is an equal amplitude spectrum signal when the microelectromechanical sensor is subjected to an equal amplitude vibration and the input spectrum signal is an unequal amplitude spectrum signal.

According to one or more embodiment of this disclosure, a microelectromechanical sensing apparatus with calibration function, comprises: a microelectromechanical sensor and an integrated circuit chip, the microelectromechanical sensor comprises a proof mass, at least one movable driving electrode disposed on the proof mass, at least one stationary driving electrode disposed on a substrate, at least one movable sensing electrode disposed on the proof mass and at least one stationary sensing electrode disposed on the substrate, wherein the integrated circuit chip comprises: a conversion module, comprising: a gain amplifier electrically connected to the at least one movable sensing electrode and the at least one stationary sensing electrode to receive a sensing signal; and an analog to digital converter electrically connected to the gain amplifier, wherein the sensing signal is converted into an input spectrum signal by the gain amplifier and the analog to digital converter; and a calibration module, comprising: a tone control circuit generating an equal amplitude spectrum signal and transmitting the equal amplitude spectrum signal to the at least one movable driving electrode and the at least one stationary driving electrode to drive the proof mass to vibrate in order to make the at least one movable sensing electrode and the at least one stationary sensing electrode generate the sensing signal, a finite impulse response filter electrically connected to the analog to digital converter, the finite impulse response filter transforms the input spectrum signal into an output spectrum signal according to a set of finite impulse response coefficients, and a coefficient calculating element electrically connected to the finite impulse response filter, wherein the coefficient calculating element calculates the set of the finite impulse response coefficients according to the input spectrum signal and a target spectrum signal when the microelectromechanical sensor is subjected to an equal amplitude vibration, the coefficient calculating element transmits the set of the finite impulse response coefficients to the finite impulse response filter, and an amplitude at each frequency point of the target spectrum signal and another amplitude of the input spectrum signal at the each frequency point are reciprocal of each other.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The operation stages of the microelectromechanical (MEM) sensing apparatus with calibration function of the present disclosure may be categorized into (1) a calibration coefficient generation stage and (2) a sensing value calibration stage. After the MEM sensing apparatus is manufactured, a quality inspection is required in the factory before the MEM sensing apparatus can be sold. When the quality inspection is performed in the factory, the MEM sensing apparatus may operate in the calibration coefficient generation stage on itself without being disposed onto a shaker. After the calibration coefficient is generated, the calibration coefficient is stored in the MEM sensing apparatus. The MEM sensing apparatus may then be sold after the quality inspection is finished. After purchasing the MEM sensing apparatus, the user disposes the MEM sensing apparatus on a device under test (DUT) (for example, manufacturing machine in a production line, cars, airplanes and other transportation vehicles) to sense the vibration of the DUT. During this time, the MEM sensing apparatus operates in the sensing value calibration stage. At this stage, the MEM sensing apparatus calibrates the initial sensing value according to the stored calibration coefficient to output an accurate sensing value.

The MEM sensing apparatus with calibration function of the present disclosure may also operate in the calibration coefficient generation stage and the sensing value calibration stage on itself after it is sold and disposed on the DUT. Accordingly, the MEM sensing apparatus may first generate a calibration coefficient adapted to a current environment when the MEM sensing apparatus operates in a different environment. Then, the MEM sensing apparatus may calibrate the initial sensing value according to the calibration coefficient adapted to the current environment and output an accurate sensing value. In other words, an accurate sensing value may be obtained even if the MEM sensing apparatus operates in different environments.

Figure 1:
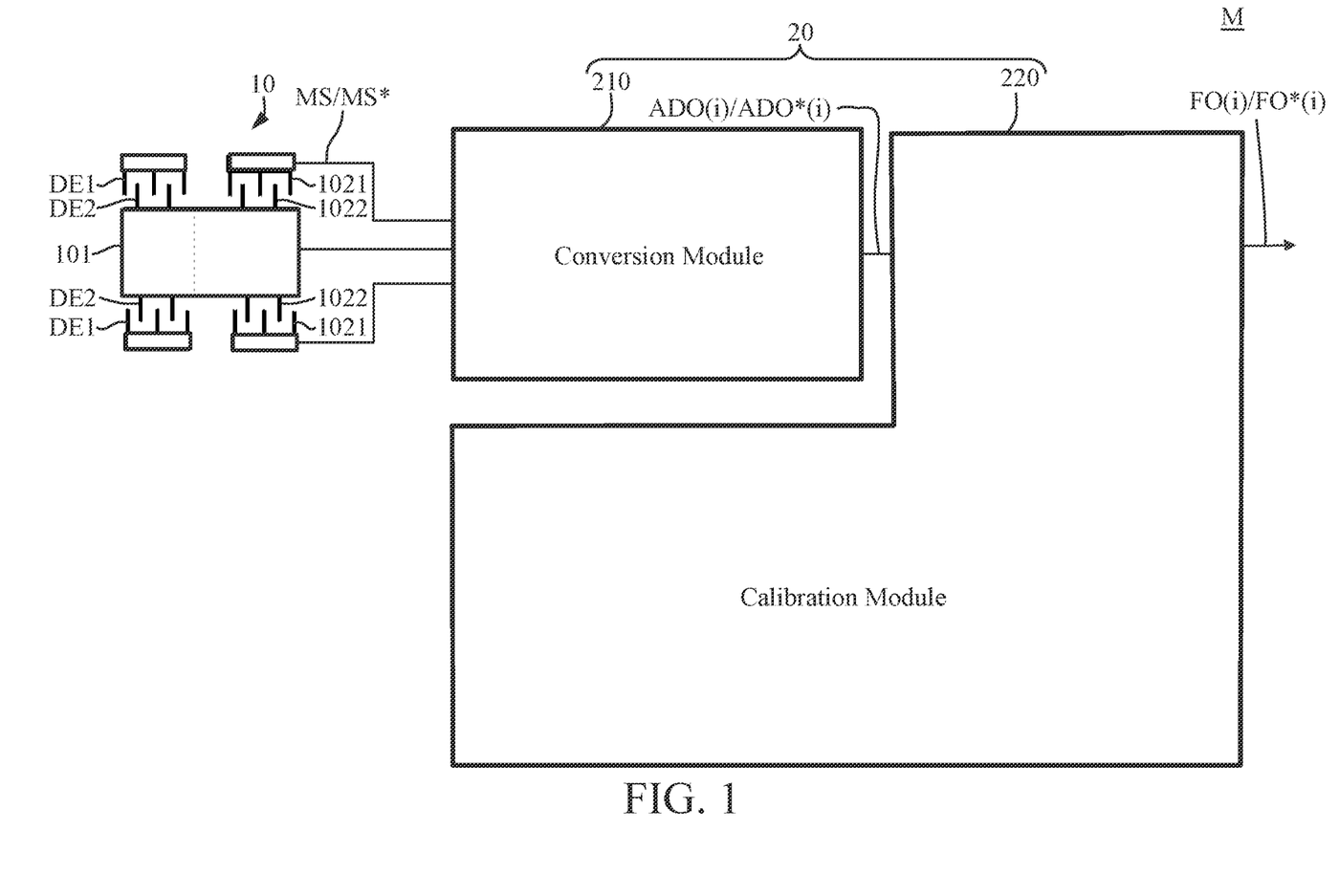
FIG. 1 is a schematic diagram of a microelectromechanical sensing apparatus with calibration function according to a calibration coefficient generation stage and a sensing value calibration stage of an embodiment of the present disclosure.

Please refer to FIG. 1, FIG. 1 is a schematic diagram of a microelectromechanical (MEM) sensing apparatus with calibration function according to a calibration coefficient generation stage and a sensing value calibration stage of an embodiment of the present disclosure. The MEM sensing apparatus M comprises a microelectromechanical (MEM) sensor 10 and an integrated circuit (IC) chip 20. The MEM sensor 10 and the IC chip 20 are respectively disposed on a substrate (not shown) and the MEM sensor 10 and the IC chip 20 are electrically connected to each other. In another embodiment, the MEM sensor 10 and the IC chip 20 may be integrated as a single system on chip (SOC).

As shown in FIG. 1, the MEM sensor 10 comprises a proof mass 101, at least one stationary driving electrode DE1 and at least one stationary sensing electrode 1021, wherein the at least one stationary driving electrode DE1 and the at least one stationary sensing electrode 1021 are respectively disposed on the substrate (not shown). Further, the MEM sensor 10 comprises at least one movable driving electrode DE2 and at least one movable sensing electrode 1022, wherein the at least one movable driving electrode DE2 and the at least one movable sensing electrode 1022 are respectively disposed on the proof mass 101 and the at least one movable driving electrode DE2 and the at least one movable sensing electrode 1022 are electrically insulated from each other. The respective number of the stationary driving electrode DE1 and the stationary sensing electrode 1021 shown in FIG. 1 are two, the respective number of the movable driving electrode DE2 and the movable sensing electrode 1022 are also two, but the present disclosure does not limit the actual numbers of the stationary driving electrode DE1, the stationary sensing electrode 1021, the movable driving electrode DE2 and the movable sensing electrode 1022.

The MEM sensor 10 comprises an elastic element (now shown) and an anchor (not shown). The elastic element (now shown) connects the proof mass 101 and the anchor (not shown) for the proof mass 101 to be suspended above the substrate (not shown). When the proof mass 101 vibrates, a distance between the stationary sensing electrode 1021 disposed on the substrate (not shown) and the movable sensing electrode 1022 disposed on the proof mass 101 changes, causing a capacitance between the stationary sensing electrode 1021 and the movable sensing electrode 1022 changes and thus output a sensing signal MS corresponding to the vibration of the proof mass 101.

The IC chip 20 comprises a conversion module 210 and a calibration module 220. The conversion module 210 electrically connects an output terminal of the stationary sensing electrode 1021 of the MEM sensor 10 and electrically connects an output terminal of the movable sensing electrode 1022 through the proof mass 101. The calibration module 220 electrically connects the conversion module 210. The conversion module 210 receives the sensing signal MS or MS* from the MEM sensor 10, and converts the sensing signal MS or MS* into an input spectrum signal ADO(i) or ADO*(i). The calibration module 220 receives the input spectrum signal ADO(i) or ADO*(i) from the conversion module 210, and transforms the input spectrum signal ADO(i) or ADO*(i) into an output spectrum signal FO(i) or FO*(i). During the calibration coefficient generation stage, the MEM sensor 10 is subjected to an equal amplitude vibration. At the same time, the input spectrum signal ADO(i) converted from the sensing signal MS is an unequal amplitude spectrum signal and the output spectrum signal FO(i) is an equal amplitude spectrum signal. In detail, when the amplitudes of the vibration which the MEM sensor 10 is subjected to are equal and the input spectrum signal is an unequal amplitude spectrum signal, it means the sensing signal MS outputted by the MEM sensor 10 is inaccurate. Under this circumstance, the calibration module 220 may calibrate this inaccurate unequal amplitude spectrum signal (input spectrum signal) into an accurate equal amplitude spectrum signal (output spectrum signal).

It should be noted that, at the sensing value calibration stage, the vibration of the proof mass 101 is generated by, for example, the vibration of the DUT. At the calibration coefficient generation stage, the vibration of the proof mass 101 is generated by a vibration signal generator in the calibration module 220 which drives the stationary driving electrode DE1 and the movable driving electrode DE2. The following paragraphs will disclose the operating scenarios of the calibration coefficient generation stage and sensing value calibration stage in more detail.

Figure 2A:
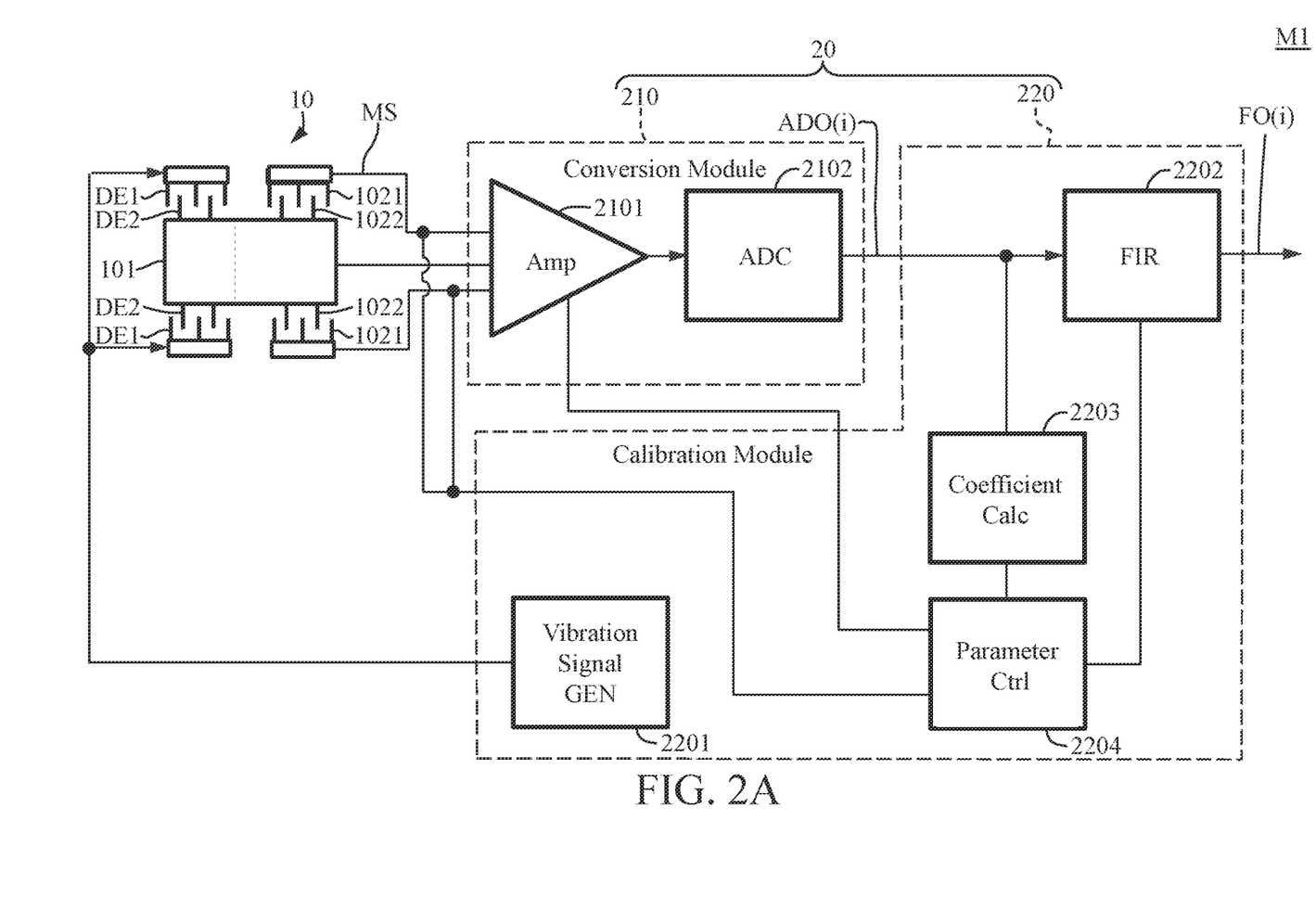
FIG. 2A is a schematic diagram of a microelectromechanical sensing apparatus according to a calibration coefficient generation stage of a first embodiment of the present disclosure.

Please refer to FIG. 2A. FIG. 2A is a schematic diagram of a microelectromechanical sensing apparatus according to a calibration coefficient generation stage of a first embodiment of the present disclosure, wherein the arrow of each block in the diagram indicates the signal output direction of that block. In this embodiment, the conversion module 210 of the IC chip 20 comprises a gain amplifier 2101 and an analog-to-digital converter (ADC) 2102. The gain amplifier 2101 electrically connects output terminals of the stationary sensing electrode 1021 and the movable sensing electrode 1022. The ADC 2102 electrically connects the output terminal of the gain amplifier 2101, wherein the gain amplifier 2101 is, for example, an analog front end (AFE) element.

The calibration module 220 comprises a vibration signal generator 2201, a finite impulse response (FIR) filter 2202, a coefficient calculating element 2203 and a parameter controlling element 2204, wherein the coefficient calculating element 2203 and the parameter controlling element 2204 both may be application specific integrated circuit (ASIC) or microprocessor. The vibration signal generator 2201 electrically connects the stationary driving electrode DE1 and the movable driving electrode DE2. The FIR filter 2202 electrically connects the output terminal of the ADC 2102. The coefficient calculating element 2203 electrically connects the output terminal of the ADC 2102 and the parameter controlling element 2204. The parameter controlling element 2204 electrically connects the gain amplifier 2101, the stationary sensing electrode 1021 and the FIR filter 2202.

As shown in FIG. 2A, at the calibration coefficient generation stage of this embodiment, the vibration signal generator 2201 (for example, a tone controller) may generate a vibration spectrum signal T(i) and output a vibration spectrum signal T(i) to the at least one stationary driving electrode DE1 and the at least one movable driving electrode DE2 to drive the proof mass 101 to vibrate. In this embodiment, the vibration spectrum signal T(i) is preferably an equal amplitude spectrum signal. The vibration spectrum signal T(i) comprises a frequency band having a plurality of working frequencies with equal amplitudes, and the working frequencies may exist at the same time or respectively exist in different periods in a time-division way (that is, the signal is separately outputted in each of the periods with one frequency at a time). The stationary sensing electrode 1021 and the movable sensing electrode 1022 are used to sense the vibration of the proof mass 101 and output a sensing signal MS corresponding to the vibration. The movable sensing electrode 1022 on the proof mass 101 may move with respect to the stationary sensing electrode 1021. When the proof mass 101 is driven to vibrate by the electrostatic force generated by the stationary driving electrode DE1 and the movable driving electrode DE2, the equivalent capacitance between the movable sensing electrode 1022 and the stationary sensing electrode 1021 on the proof mass 101 may be changed for outputting a sensing signal MS.

The gain amplifier 2101 and the ADC 2102 receives the sensing signal MS outputted from the stationary sensing electrode 1021 and the movable sensing electrode 1022, so as to multiply the sensing signal MS with a gain and perform analog/digital conversion to generate the input spectrum signal ADO(i). The gain amplifier 2101 electrically connects the parameter controlling element 2204 that controls the gain of the gain amplifier 2101. Said gain may be 1 or other values, the present disclosure does not limit the value of the gain. In an embodiment not shown in the drawings, the coefficient calculating element 2203 electrically connects the vibration signal generator 2201 to obtain the vibration spectrum signal T(i) outputted by the vibration signal generator 2201. The coefficient calculating element 2203 may also store the vibration spectrum signal T(i) in advance.

Figure 2B:
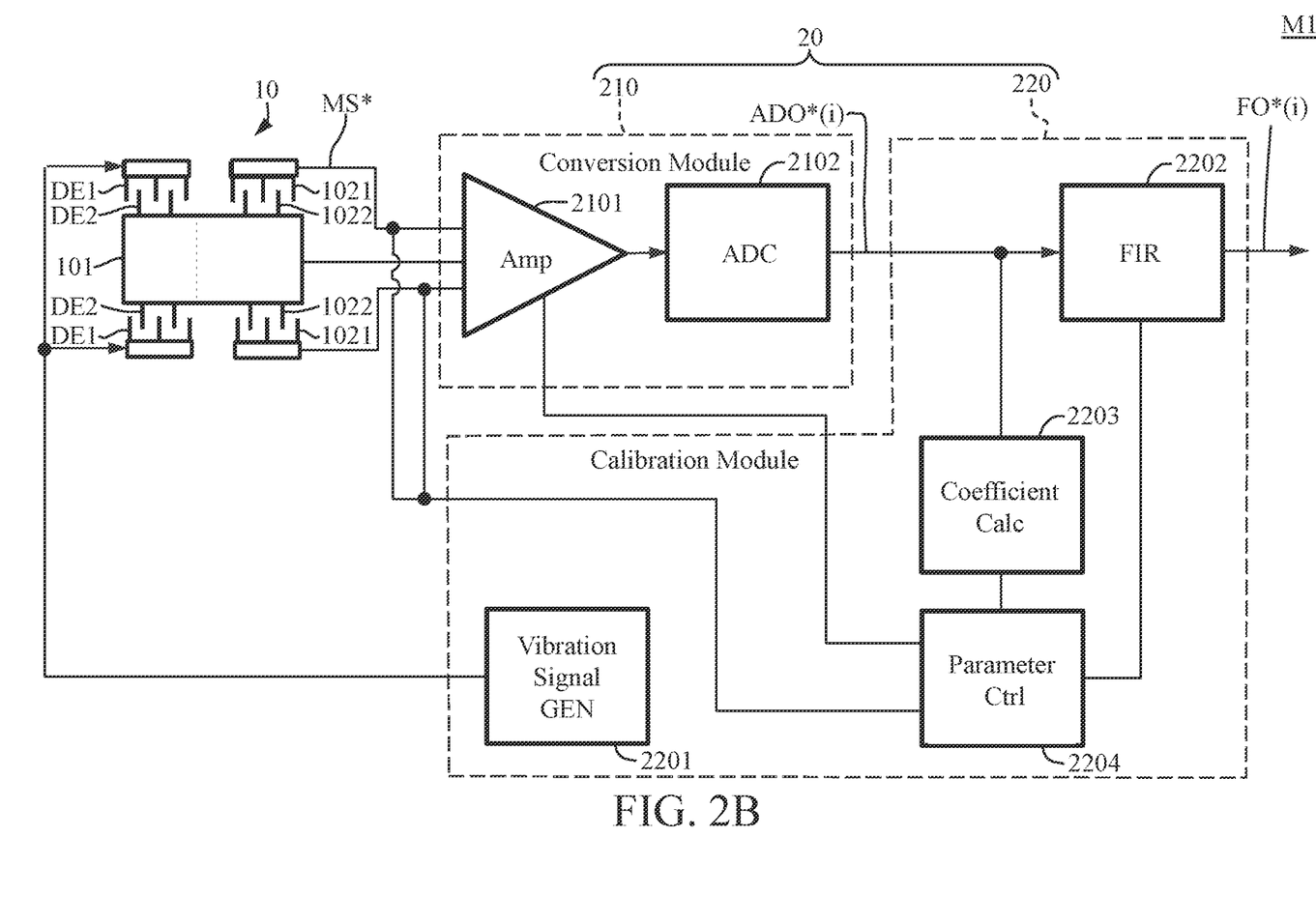
FIG. 2B is a schematic diagram of a microelectromechanical sensing apparatus according to a sensing value calibration stage of a first embodiment of the present disclosure.
Figure 3A:
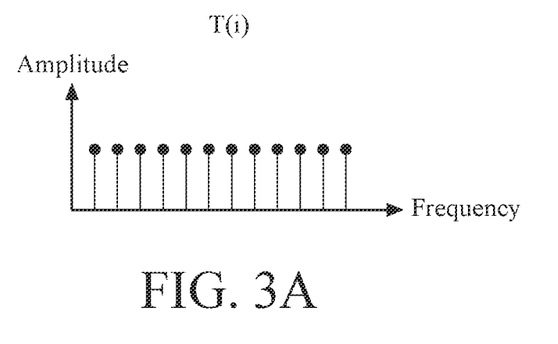
FIGS. 3A to 3D are schematic diagrams of spectrum signals.
Figure 3B:
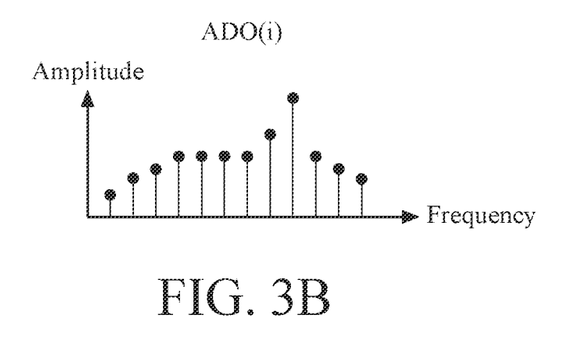
Figure 3C:
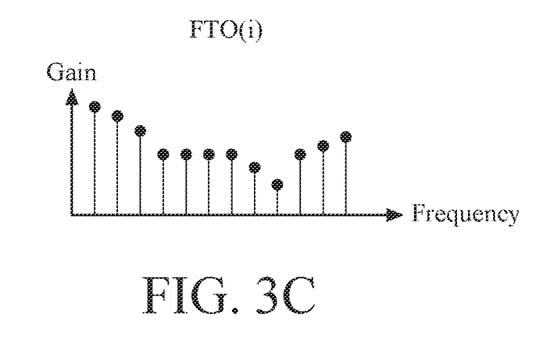
Figure 3D:
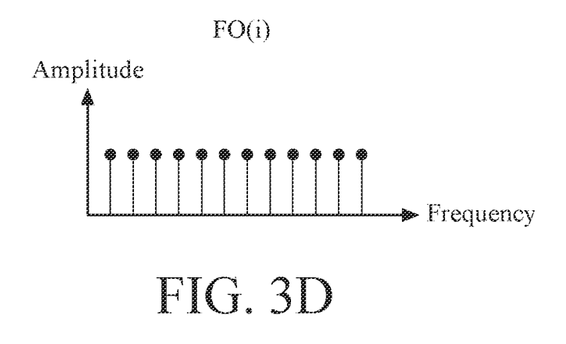

Accordingly, during the calibration coefficient generation stage, the vibration the MEM sensing apparatus M1 is subjected to is an equal amplitude vibration, the coefficient calculating element 2203 may use the reciprocal of the amplitude of each frequency point in the input spectrum signal ADO(i) as shown in FIG. 3C to form a new spectrum signal as shown in FIG. 3C. The coefficient calculating element 2203 may set this new spectrum signal as the target spectrum signal FTO(i) of the FIR filter 2202. The coefficient calculating element 2203 may calculate a set of the FIR coefficients (FIR Co.) according to this target spectrum signal FTO(i) and the input spectrum signal ADO(i). The set of the FIR coefficients may be used by the FIR filter 2202 to calibrate the input spectrum signal ADO*(i) as shown in FIG. 2B at the sensing value calibration stage. To be more specific, during the calibration coefficient generation stage, the parameter controlling element 2204 stores the FIR coefficient after the coefficient calculating element 2203 transmits the above-mentioned FIR coefficient to the parameter controlling element 2204. The parameter controlling element 2204 outputs the FIR coefficient to the FIR filter 2202 that outputs an output spectrum signal FO(i) after receiving the input spectrum signal ADO(i). When the output spectrum signal FO(i) of the FIR filter 2202 is an equal amplitude output spectrum signal (as shown in FIG. 3D), the MEM sensing apparatus of the present embodiment completes the calibration coefficient generation stage. The equal amplitude output spectrum signal FO(i) is the result of the FIR filter 2202 using the above-mentioned FIR coefficient to transform the input spectrum signal ADO(i). In addition, in another embodiment, the storing/outputting the FIR coefficient performed by the parameter controlling element 2204 may also be performed by the coefficient calculating element 2203.

In the calibration coefficient generation stage described above, the FIR coefficients stored by the parameter controlling element 2204 may be used in the sensing value calibration stage. Please refer to FIG. 2B. FIG. 2B is a schematic diagram of a microelectromechanical sensing apparatus according to a sensing value calibration stage of a first embodiment of the present disclosure. In the sensing value calibration stage, the MEM sensing apparatus M1 of the present embodiment is disposed on the device under test (DUT), and is subjected to the vibration of the DUT. It is worth noticing that, the vibration of the DUT is not necessary an equal amplitude vibration. After the MEM sensor 10 in the MEM sensing apparatus M1 senses the vibration of the DUT, the MEM sensor 10 outputs a sensing signal MS*. The sensing signal MS* is converted into an input spectrum signal ADO*(i) after processed by the gain amplifier 2101 and the ADC 2102. The parameter controlling element 2204 may output the FIR coefficient to the FIR filter 2202 according to the sensing signal MS*. The FIR filter 2202 may transform the input spectrum signal ADO*(i) that is inputted to the FIR filter 2202 into an accurate output spectrum signal FO*(i) according to the FIR coefficient. That is, if the input spectrum signal ADO*(i) is not calibrated by the FIR filter 2202 as the present embodiment, the obtained sensing signal will contain a certain degree of error. The error may come from different sources, such as the manufacturing error of the MEM sensor 10, the aging of the material of the MEM sensor 10, or the change of environment of the MEM sensing apparatus M1. It should be noted that, at the sensing value calibration stage, the MEM sensing apparatus M1 is used to sense the vibration of the DUT, and the vibration signal generator 2201 does not operate in the sensing value calibration stage.

Figure 4:
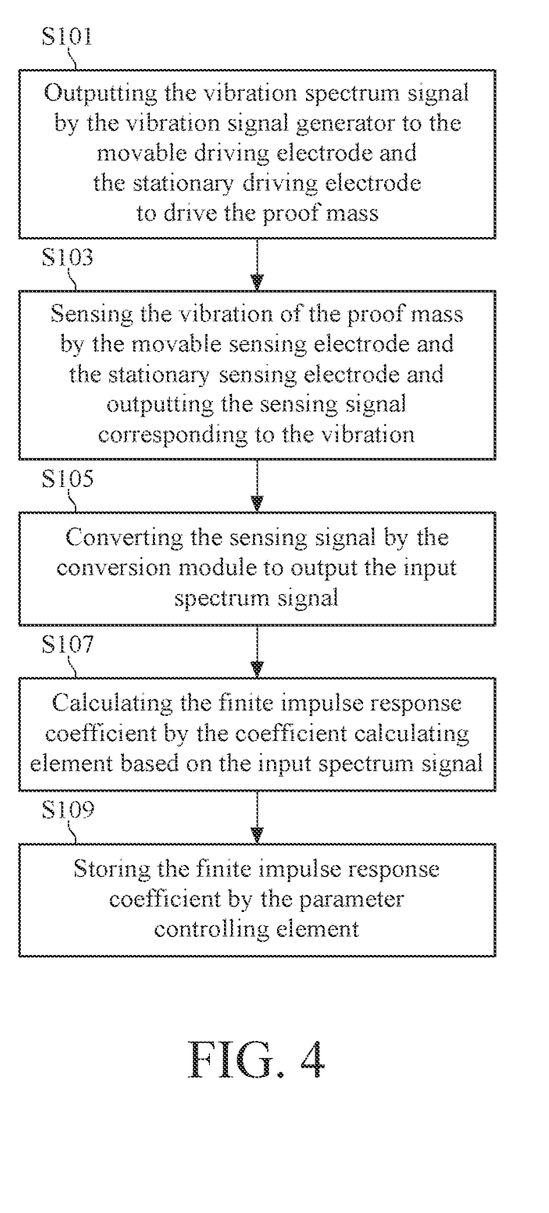
FIG. 4 is a flow chart of an operation method of a microelectromechanical sensing apparatus at the calibration coefficient generation stage according to an embodiment of the present disclosure.

In order to explain in more detail how the coefficient calculating element 2203 calculates the FIR coefficient and how the parameter controlling element 2204 stores the FIR coefficient, please refer back to FIG. 2A as well as FIGS. 3A to 3D and FIG. 4 together. FIGS. 3A to 3D are schematic diagrams of spectrum signals. FIG. 4 is a flow chart of an operation method of a microelectromechanical sensing apparatus at the calibration coefficient generation stage according to an embodiment of the present disclosure. The details of the steps are described below.

In FIG. 4, Step S101: Outputting the vibration spectrum signal by the vibration signal generator to the movable driving electrode and the stationary driving electrode to drive the proof mass. Step S103: Sensing the vibration of the proof mass by the movable sensing electrode and the stationary sensing electrode and outputting the sensing signal corresponding to the vibration. S105: Converting the sensing signal by the conversion module to output the input spectrum signal.

As described above, the vibration spectrum signal T(i) shown in FIG. 3A has a plurality of working frequencies with equal amplitudes. The sensing signal MS outputted by the stationary sensing electrode 1021 and the movable sensing electrode 1022 of the MEM sensor 10 may generate errors due to various reasons (such as variations in manufacturing process, aging of the material or change of the environment). Therefore, the input spectrum signal ADO(i) outputted from the conversion module 210 by converting the sensing signal MS may not be an equal amplitude spectrum signal, instead would be an unequal amplitude spectrum signal as shown in FIG. 3B.

Step S107: Calculating the FIR coefficient by the coefficient calculating element based on the input spectrum signal. S109: Storing the FIR coefficient by the parameter controlling element.

In step S107, the coefficient calculating element 2203 may use the reciprocal of the amplitude of the input spectrum signal ADO(i) at each frequency point as the gain of the target spectrum signal FTO(i) (as shown in FIG. 3C) at each corresponding frequency. When the target spectrum signal FTO(i) is obtained, the coefficient calculating element 2203 may calculate a set of FIR coefficients according to the target spectrum signal FTO(i) and the input spectrum signal ADO(i).

To calculate the FIR coefficients, the coefficient calculating element 2203 may electrically connect the vibration signal generator 2201 to receive the vibration spectrum signal T(i) and obtain each frequency and the corresponding amplitude of the vibration spectrum signal T(i) at a predetermined frequency band. In detail, if each amplitude of the vibration spectrum signal T(i) obtained by the coefficient calculating element 2203 had been normalized, the coefficient calculating element 2203 may directly use the reciprocal of the amplitude at each frequency of the input spectrum signal ADO(i) as the gain of each corresponding frequency of the target spectrum signal FTO(i). For example, if the frequency points of the input spectrum signal ADO(i) are $f_0, f_1, f_2 \ldots f_n$, and the amplitudes respectively corresponding to each of the frequency points are A1, A2, A3 . . . An, then the corresponding gains at each of the frequency points $f_0, f_1, f_2 \ldots f_n$ of the target spectrum signal FTO(i) respectively are 1/A1, 1/A2, 1/A3 . . . 1/An.

If the amplitudes of the vibration spectrum signal T(i) obtained by the coefficient calculating element 2203 are not normalized, the way of the coefficient calculating element 2203 obtaining the target spectrum signal FTO(i) may be first dividing the amplitude at each frequency of the vibration spectrum signal T(i) by the amplitude at each frequency of the input spectrum signal ADO(i). Then, the division result at each frequency is used as the gain at each frequency of the target spectrum signal FTO(i). For example, if the frequency points of the vibration spectrum signal T(i) are $f_0', f_1', f_2' \ldots f_n'$, and the amplitudes corresponding to the frequency points are A1', A2', A3' . . . An', then the coefficient calculating element 2203 may first dividing the amplitudes A1', A2', A3' . . . An' of the vibration spectrum signal T(i) by the amplitudes A1, A2, A3 . . . An of the input spectrum signal ADO(i). The division results are A1'/A1, A2'/A2, A3'/A3 . . . An'/An. Then, the coefficient calculating element 2203 may use A1'/A1, A2'/A2, A3'/A3 . . . An'/An as gains.

After obtaining each gain at each frequency of the target spectrum signal FTO(i), the coefficient calculating element 2203 then performs a bandpass impulse response filter calculation based on the gains to calculate the FIR coefficient at each frequency. Specifically, the coefficient calculating element 2203 calculates a bandpass filter coefficient h(n) by the following equation (1), then calculates the FIR coefficient based on the bandpass filter coefficient h(n). Please refer to equation (1), a center point of each frequency band is the frequency point $f_n$, and the bandpass filter coefficient h(n) and the FIR coefficient calculated according to the bandpass filter coefficient h(n) are coefficients comprising the frequency band including the frequency point $f_n$. However, the FIR coefficient may be calculated in various ways, further details may be found in "Digital Signal Processing: Fundamentals and Applications (Second Edition), Chapter 7: Finite Impulse Response Filter Design, by Lizhe Tan and Jean Jiang". The following will explain equation (1) in more detail.

It should be first noted that, although the above description uses one frequency corresponding to one amplitude as examples, the frequency mentioned above is preferably a frequency band. Further, since "one signal (impulse)" is actually formed of connecting a plurality of different amplitudes in one frequency band, the "signal" explained below refers to a signal having different amplitudes at one frequency band, and the central frequency of the frequency band is the frequency point. In equation (1), h(n) is the bandpass filter coefficient, $A_n$ is the gain at each frequency point $f_n$ of the target spectrum signal FTO(i); M is number of samples between the frequency point $f_n$ and the boundary value (frequency) of the signal, wherein the central frequency of each frequency band is the frequency point $f_n$ (2M+1 is the total number of samples of the frequency band with the frequency point $f_n$ as the central frequency); $\Omega_H$ and $\Omega_L$ respectively are the cut-off frequencies of the frequency point $f_n$. Take frequency point $f_1$ as an example, $\Omega_H$ and $\Omega_L$ respectively are: $\Omega_H=(f_1+f_2)/2$; $\Omega_L=(f_0+f_1)/2$.

$$h(n) = \begin{cases} \dfrac{\Omega_H - \Omega_L}{\pi} \times A_n, n = 0 \\ \left(\dfrac{\sin(\Omega_H n)}{n \times \pi} - \dfrac{\sin(\Omega_L n)}{n \times \pi}\right) \times A_n, n \neq 0 \end{cases} -M \leq n \leq M \quad \text{equation (1)}$$

In other words, in a case where one signal is viewed as one signal point (as shown in FIGS. 3A-3D), n=0; in a case where one signal is viewed as distributed in one frequency band, the signal comprises two conditions with one being n=0 (the center point of the frequency band) and another one being n≠0 (the rest of the signal points except for the center point), and the accuracy of h(n) increases as M increases. Therefore, through the FIR coefficient calculated according to the bandpass filter coefficient h(n), the amplitudes at both left and right sides of the central frequency $f_n$ of the frequency band of the output spectrum signal FO(i) may approach the amplitude at the frequency point $f_n$ of the vibration spectrum signal T(i).

Further, a plurality of frequency bands may form a frequency domain, and each frequency band has one bandpass filter response. Therefore, the finite impulse response of the FIR filter 2202 of one frequency domain (covering $f_0$, $f_1$, $f_2$ . . . ) comprises the bandpass filter impulse response of each of the frequency bands ($f_0$, $f_1$, $f_2$ . . . ). In the frequency domain (covering $f_0$, $f_1$, $f_2$ . . . ), the bandpass filter coefficient h(n) of a single frequency band comprises a plurality of impulse response coefficients of the bandpass filter corresponding to the frequency band. For example, assuming the central frequency of the frequency band is $f_0$, the bandpass filter coefficient of the frequency band ($f_0$ being the central frequency) is represented as BP0. In a case where M=1, the bandpass filter coefficient of the frequency band ($f_0$ being the central frequency) may comprise $BP0\_h(-1)$, $BP0\_h(0)$, $BP0\_h(1)$. In short, the FIR coefficients of the FIR filter 2202 at one frequency domain (covering $f_0$, $f_1$, $f_2$ . . . ) are formed of combining the bandpass filter coefficients of the frequency bands ($f_0$, $f_1$, $f_2$ . . . ).

To further illustrate, take the FIR filter 2202 covering six frequency bands (central frequency being $f_n$, n=0~5, that is, $f_0$, $f_1$, $f_2$, $f_3$, $f_4$ and $f_5$) as an example, the finite impulse response is formed of combining a plurality of bandpass filter impulse responses with the frequency band being $f_0$, $f_1$, $f_2$, $f_3$, $f_4$ and $f_5$. On time domain, the output spectrum signal of the FIR filter 2202 may be represented as FO(t), and the method of calculating the output spectrum signal FO(t) may be using equation (2) as follow:

$$FO(t)=BP0(t)+BP1(t)+BP2(t)+BP3(t)+BP4(t)+BP5(t) \quad \text{equation (2)}$$

wherein "t" is the time point corresponding to each frequency band ($f_0$, $f_1$, $f_2$, $f_3$, $f_4$ and $f_5$), BP0(t), BP1(t), BP2(t), BP3(t), BP4(t), BP5(t) are output signals at the time point t of the bandpass filter with frequency bands $f_0$, $f_1$, $f_2$, $f_3$, $f_4$ and $f_5$.

The output signals BPn(t) of each bandpass filter may be expressed as equation (3):

$$BPn(t)=BPn\_h(-M)ADO(t)+BPn\_h(-M+1)ADO(t-1)+BPn\_h(-M+2)ADO(t-2)+\cdots+BPn\_h(M)ADO(t-2M) \quad \text{equation (3)}$$

wherein ADO is the input spectrum signal ADO(i) outputted by the ADC 2102.

In an example where M=2, the output of the bandpass filter of the frequency band $f_n$ is:

$$BPn(t)=BPn\_h(-2)ADO(t)+BPn\_h(-1)ADO(t-1)+BPn\_h(0)ADO(t-2)+BPn\_h(1)ADO(t-3)+BPn\_h(2)ADO(t-4)$$

Therefore, in the case where M=2 and the number of frequency bands of the FIR filter 2202 is 5 (the central frequencies of the frequency bands are $f_0$, $f_1$, $f_2$, $f_3$, $f_4$ and $f_5$), the output spectrum signal FO(t) of the FIR filter 2202 may be further expressed as:

$$FO(t) = \left(\sum_{n=0}^{5} BPn\_h(-2)\right) ADO(t) +$$
$$\left(\sum_{n=0}^{5} BPn\_h(-1)\right) ADO(t-1) + \left(\sum_{n=0}^{5} BPn\_h(0)\right) ADO(t-2) +$$
$$\left(\sum_{n=0}^{5} BPn\_h(1)\right) ADO(t-3) + \left(\sum_{n=0}^{5} BPn\_h(2)\right) ADO(t-4)$$

wherein, $$\sum_{n=0}^{5} BPn_{h(-2)}, \sum_{n=0}^{5} BPn\_h(-1), \sum_{n=0}^{5} BPn\_h(0),$$
$$\sum_{n=0}^{5} BPn\_h(1) \text{ and } \sum_{n=0}^{5} BPn\_h(2)$$

respectively are the FIR coefficients $FTO_{h(-2)}$, $FTO_{h(-1)}$, $FTO\_h(0)$, $FTO\_h(1)$, $FTO\_h(2)$ of the FIR filter 2202, and the output spectrum signal FO(t) of the FIR filter 2202 may be further expressed in a general form as:

$$FO(t) = \sum_{m=-M}^{M} FTO\_h(m) ADO(t-m-M)$$

wherein FTO_h(m) is the FIR coefficient, and may be further expressed in a general form as:

$$FTO\_h(m) = \sum_{n=0}^{N} BPn\_h(m)$$

wherein N+1 is the number of frequency bands of the FIR filter 2202, m is an integer between −M and M, wherein BPn_h(m) is calculated according to equation (1).

After the parameter controlling element 2204 obtains the FIR coefficient, the parameter controlling element 2204 may further transmit the FIR coefficient to the FIR filter 2202. The FIR filter 2202 compensate the input spectrum according to the FIR coefficient to output an output spectrum signal to a terminal device. A user may determine whether the output spectrum signal outputted by the FIR filter 2202 is an equal amplitude spectrum signal according to the output spectrum signal. If the output spectrum signal displayed on the terminal device is the output spectrum signal FO(i) as shown in FIG. 3D, then the FIR coefficient stored by the parameter controlling element 2204 may be confirmed as the correct FIR coefficient.

Figure 5:
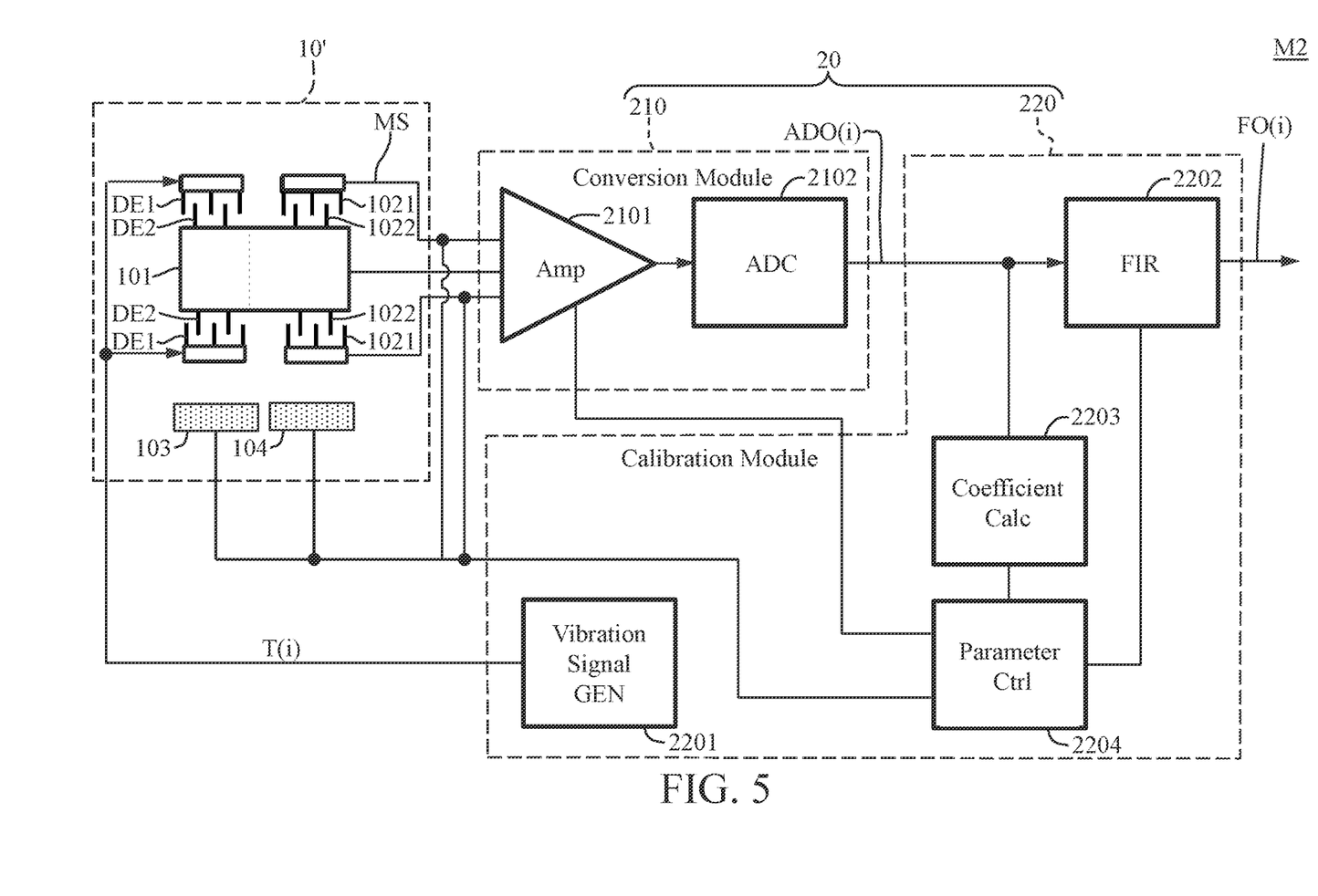
FIG. 5 is a schematic diagram of a microelectromechanical sensing apparatus according to a calibration coefficient generation stage of a second embodiment of the present disclosure.

Please refer to FIG. 5, FIG. 5 is a functional diagram of a microelectromechanical (MEM) sensing apparatus according to a second embodiment of the present disclosure. A part of the MEM sensing apparatus M2 of FIG. 5 is the same as the MEM sensing apparatus M1 shown in FIGS. 2A and 2B. The difference between the MEM sensing apparatus M1 and the MEM sensing apparatus M2 is that, the MEM sensor 10' of the MEM sensing apparatus M2 of FIG. 5 further comprises a heater 103 and a temperature sensor 104. The heater 103 may electrically connect the parameter controlling element 2204 or be independently disposed in the MEM sensor 10', the present disclosure does not limit the electrical connection of the heater 103. The temperature sensor 104 may also electrically connect the parameter controlling element 2204.

Specifically, before the vibration signal generator 2201 outputs the vibration spectrum signal T(i) (before step S101), the heater 103 may maintain the temperature of the MEM sensing apparatus M2 in a predetermined temperature range. The predetermined temperature range is preferably a temperature range of a working DUT when the MEM sensing apparatus M2 is disposed on the DUT. By using the heater 103, the temperature of the MEM sensing apparatus M2 can be maintained. Therefore, the FIR coefficient obtained by the MEM sensing apparatus M2 in a predetermined temperature range may allow the MEM sensing apparatus M2 to output a more accurate vibration spectrum when sensing the working DUT working under the temperature range.

When the MEM sensing apparatus M2 works in different working temperatures, the sensing result may contain errors caused by the temperature. Therefore, to overcome this problem, at the calibration coefficient generation stage, the heater 103 may maintain the temperature of the MEM sensing apparatus M2 in different temperature ranges (one temperature range at a time). Then, the vibration signal generator 2201 may output the vibration spectrum signals T(i) at said different temperature ranges. The MEM sensing apparatus M2 then may calculate the sets of FIR coefficients or a plurality of FIR coefficients according to the steps of FIG. 4. Specifically, take one vibration spectrum signal T(i) corresponding to one frequency domain for example, when the sensing signal MS is a combined signal of a plurality of frequencies, one frequency domain may correspond to a plurality of sets of FIR coefficients, and each set of FIR coefficients correspond to one temperature range. When the sensing signal MS is a time-division signal, one frequency may correspond to a plurality of FIR coefficients, and each FIR coefficient corresponds to one temperature range. In other words, one frequency domain may correspond to a plurality of sets of FIR coefficients at different temperature ranges, and one frequency may correspond to a plurality of FIR coefficients at different temperature ranges. The parameter controlling element 2204 stores the corresponding relationship of the frequency/frequency domain, the FIR coefficients and the corresponding temperatures.

For example, also before the vibration signal generator 2201 outputs the vibration spectrum signal T(i) (before step S101), the heater 103 (controlled by the parameter controlling element 2204) may maintain the temperature of the MEM sensing apparatus M2 within a first temperature range. The temperature sensor 104 senses the temperature of the MEM sensing apparatus M2 to obtain a first temperature range, and transmits the first temperature range to the parameter controlling element 2204. The parameter controlling element 2204 obtains a first set of the FIR coefficients corresponding to the first temperature range. Then, the heater 103 maintains the temperature of the MEM sensing apparatus M2 within a second temperature range. The temperature sensor 104 senses the temperature of the MEM sensing apparatus M2 to obtain the second temperature range, and transmits the second temperature range to the parameter controlling element 2204 to obtain a second set of the FIR coefficients corresponding to the second temperature range, wherein the first temperature range is different from the second temperature range. Accordingly, the MEM sensing apparatus M2 may obtain a plurality of sets of the FIR coefficients that are temperature dependent.

Accordingly, during the sensing value calibration stage (the vibration signal generator 2201 does not operate), the temperature sensor 104 first senses the environmental temperature of the MEM sensing apparatus M2 (the working temperature of the DUT), then the parameter controlling element 2204 outputs one FIR coefficient or a set of FIR coefficients corresponding to the temperature range that the environmental temperature falls into. To be more clear, the heater 103 and the temperature sensor 104 of the MEM sensing apparatus M2 allow the MEM sensing apparatus M2 to obtain FIR coefficients that are temperature dependent that allows MEM sensing apparatus M2 to obtain an accurate sensing result under different temperature ranges.

Figure 6:
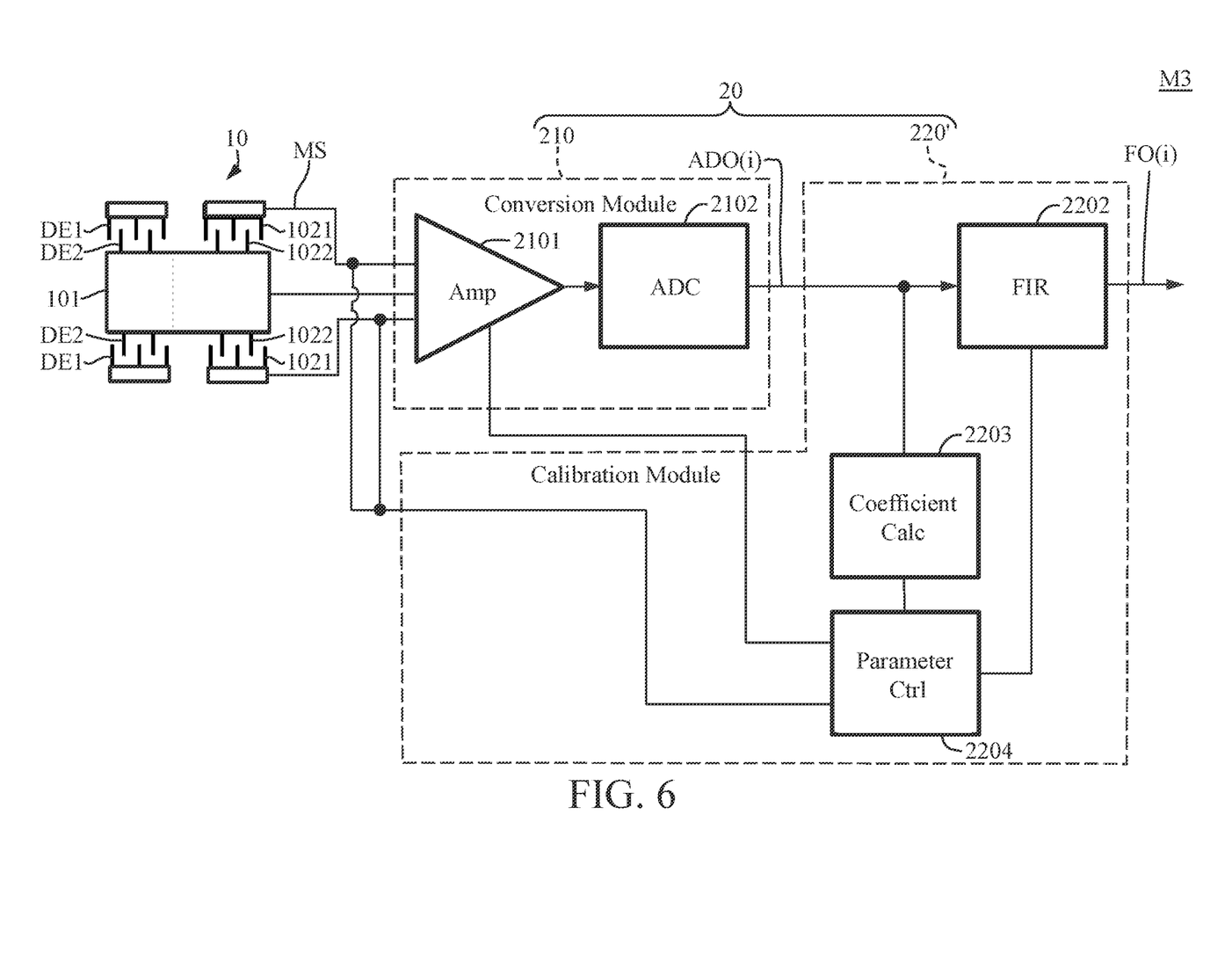
FIG. 6 is a schematic diagram of a microelectromechanical sensing apparatus with calibration function according to a calibration coefficient generation stage and a sensing value calibration stage of a third embodiment of the present disclosure.

Please refer to FIG. 6. FIG. 6 is a functional diagram of a microelectromechanical (MEM) sensing apparatus M3 according to a third embodiment of the present disclosure. A part of the MEM sensing apparatus M3 of FIG. 6 is the same as the MEM sensing apparatus M1 shown in FIGS. 2A and 2B. The difference between the MEM sensing apparatus M1 and the MEM sensing apparatus M3 is that, the vibration signal generator 2201 of the MEM sensing apparatus M1 shown in FIGS. 2A and 2B may be omitted from the calibration module 220' of the MEM sensing apparatus M3 of FIG. 6. When the calibration module 220' only comprises the FIR filter 2202, the coefficient calculating element 2203 and the parameter controlling element 2204, the overall footprint area of the IC chip 20' may be decreased, and thereby reducing the cost of the IC chip 20' as well as reducing the overall size of the MEM sensing apparatus M3. It should also be noted that, even though the stationary driving electrode DE1, the movable driving electrode DE2 and the coefficient calculating element 2203 do not operate during the sensing value calibration stage, the MEM sensing apparatus M3 may still have the stationary driving electrode DE1, the movable driving electrode DE2 and the coefficient calculating element 2203. Accordingly, after the MEM sensing apparatus M3 is shipped out from the factory, as long as the stationary driving electrode DE1 and the movable driving electrode DE2 are electrically connected to a vibration signal generator (such as the vibration signal generator 2201 as shown in FIGS. 2A and 2B) or another external vibration signal generator, the MEM sensing apparatus M3 may easily update the FIR coefficients stored in the parameter controlling element 2204 based on the calibration coefficient generation stage as described above. Therefore, for the MEM sensing apparatus M3 to accurately sense the vibration of the DUT even in different environments, the MEM sensing apparatus M3 may update the FIR coefficient in different working environments by using an external vibration signal generator.

In addition, the MEM sensor 10 of the MEM sensing apparatus M3 shown in FIG. 6 may also comprise the heater 103 and the temperature sensor 104 shown in FIG. 5. Therefore, during the calibration coefficient generation stage, the parameter controlling element 2204 may store the temperature dependent FIR coefficients. During the sensing value calibration stage, the parameter controlling element 2204 may output the temperature dependent FIR coefficient to the FIR filter 2202, wherein the detail implementation of obtaining the temperature dependent FIR coefficients has been described along with FIG. 5 and will not be repeated herein.

In view of the above description, the MEM sensing apparatus with calibration function according to one or more embodiments of the present disclosure uses finite impulse response filter to calibrate the input spectrum signal. Accordingly, accurate amplitudes at different frequency points may be obtained. Therefore, according to one or more embodiments of the present disclosure, the frequency range of the MEM sensing apparatus may be broadened. Further, the MEM sensing apparatus with calibration function according to one or more embodiments of the present disclosure has a vibration signal generator, so the FIR coefficient may be obtained without disposing the MEM sensing apparatus on a vibration testing equipment, and the vibration signal of the DUT may be directly calibrated. Therefore, the calibration process and calibration time of the MEM sensing apparatus may be reduced. In addition, since the MEM sensing apparatus with calibration function according to one or more embodiments of the present disclosure obtains FIR coefficients corresponding to different temperatures and frequencies, the sensing result of the MEM sensing apparatus is not affected by the environmental temperature and thereby generating an accurate sensing result.

What is claimed is:

1. A microelectromechanical sensing apparatus with calibration function, comprising:
   a microelectromechanical sensor, comprising:
   a proof mass,
   at least one movable driving electrode disposed on the proof mass,
   at least one stationary driving electrode disposed on a substrate,
   at least one movable sensing electrode disposed on the proof mass, and
   at least one stationary sensing electrode disposed on the substrate, wherein the at least one movable sensing electrode and the at least one stationary sensing electrode output a sensing signal when the proof mass vibrates; and
   an integrated circuit chip, comprising:
   a conversion module electrically connected to the microelectromechanical sensor, wherein the conversion module converts the sensing signal into an input spectrum signal, and
   a calibration module electrically connected to the conversion module, wherein the calibration module receives the input spectrum signal and transforms the input spectrum signal into an output spectrum signal;
   wherein, the output spectrum signal is an equal amplitude spectrum signal when the microelectromechanical sensor is subjected to an equal amplitude vibration and the input spectrum signal is an unequal amplitude spectrum signal.

2. The microelectromechanical sensing apparatus with calibration function according to claim 1, wherein the calibration module comprises a finite impulse response filter, the finite impulse response filter is electrically connected to the conversion module, and the finite impulse response filter transforms the input spectrum signal into the output spectrum signal according to a set of finite impulse response coefficients.

3. The microelectromechanical sensing apparatus with calibration function according to claim 2, wherein the conversion module comprises a gain amplifier and an analog to digital converter, the gain amplifier is electrically connected to the at least one movable sensing electrode and the at least one stationary sensing electrode, and the analog to digital converter is electrically connected to the gain amplifier and the finite impulse response filter.

4. The microelectromechanical sensing apparatus with calibration function according to claim 3, wherein the calibration module comprises a coefficient calculating element, the coefficient calculating element is electrically connected to the finite impulse response filter, the coefficient calculating element performs calculation according to the input spectrum signal and a target spectrum signal when the microelectromechanical sensor is subjected to the equal amplitude vibration to generate the finite impulse response coefficients, and an amplitude at each frequency point of the target spectrum signal and another amplitude of the input spectrum signal at the each frequency point are reciprocal of each other.

5. The microelectromechanical sensing apparatus with calibration function according to claim 4, wherein the calibration module further comprises a parameter controlling element, the coefficient calculating element is electrically connected to the parameter controlling element, the parameter controlling element is electrically connected to the finite impulse response filter, the parameter controlling element receives the set of the finite impulse response coefficients from the coefficient calculating element and stores the set of the finite impulse response coefficients, and the parameter controlling element further outputs the set of the finite impulse response coefficients to the finite impulse response filter.

6. The microelectromechanical sensing apparatus with calibration function according to claim 5, wherein the microelectromechanical sensor further comprises a heater and a temperature sensor, and the heater and the temperature sensor are electrically connected to the parameter controlling element.

7. The microelectromechanical sensing apparatus with calibration function according to claim 4, wherein the calibration module further comprises a vibration signal generator, the vibration signal generator generates a vibration spectrum signal and transmits the vibration spectrum signal to the at least one movable driving electrode and the at least one stationary driving electrode to drive the proof mass to vibrate.

8. The microelectromechanical sensing apparatus with calibration function according to claim 7, wherein the vibration spectrum signal is the equal amplitude spectrum signal.

9. The microelectromechanical sensing apparatus with calibration function according to claim 7, wherein the vibration signal generator is a tone control circuit.

10. A microelectromechanical sensing apparatus with calibration function, comprising:
a microelectromechanical sensor, comprising:
a proof mass,
at least one movable driving electrode disposed on the proof mass,
at least one stationary driving electrode disposed on a substrate,
at least one movable sensing electrode disposed on the proof mass, and
at least one stationary sensing electrode disposed on the substrate, wherein the at least one movable sensing electrode and the at least one stationary sensing electrode output a sensing signal when the proof mass vibrates; and
an integrated circuit chip, comprising:
a conversion module electrically connected to the microelectromechanical sensor, wherein the conversion module converts the sensing signal into an input spectrum signal, and
a calibration module electrically connected to the conversion module and comprising a vibration signal generator,
wherein the calibration module receives the input spectrum signal and transforms the input spectrum signal into an output spectrum signal, and the output spectrum signal is an equal amplitude spectrum signal when the microelectromechanical sensor is subjected to an equal amplitude vibration and the input spectrum signal is an unequal amplitude spectrum signal.

11. The microelectromechanical sensing apparatus with calibration function according to claim 10, wherein the vibration signal generator generates a vibration spectrum signal and transmits the vibration spectrum signal to the at least one movable driving electrode and the at least one stationary driving electrode to drive the proof mass to vibrate, and the vibration spectrum signal is the equal amplitude spectrum signal.

12. The microelectromechanical sensing apparatus with calibration function according to claim 10, wherein the vibration signal generator is a tone control circuit.

13. The microelectromechanical sensing apparatus with calibration function according to claim 10, wherein the calibration module comprises a finite impulse response filter, the finite impulse response filter is electrically connected to the conversion module, and the finite impulse response filter transforms the input spectrum signal into the output spectrum signal according to a set of finite impulse response coefficients.

14. The microelectromechanical sensing apparatus with calibration function according to claim 10, wherein the conversion module comprises a gain amplifier and an analog to digital converter, the gain amplifier is electrically connected to the at least one movable sensing electrode and the at least one stationary sensing electrode, and the analog to digital converter is electrically connected to the gain amplifier and the calibration module.

15. A microelectromechanical sensing apparatus with calibration function, comprising:
a microelectromechanical sensor and an integrated circuit chip, the microelectromechanical sensor comprises a proof mass, at least one movable driving electrode disposed on the proof mass, at least one stationary driving electrode disposed on a substrate, at least one movable sensing electrode disposed on the proof mass and at least one stationary sensing electrode disposed on the substrate, wherein the integrated circuit chip comprises:
a conversion module, comprising:
a gain amplifier electrically connected to the at least one movable sensing electrode and the at least one stationary sensing electrode to receive a sensing signal; and
an analog to digital converter electrically connected to the gain amplifier, wherein the sensing signal is converted into an input spectrum signal by the gain amplifier and the analog to digital converter; and
a calibration module, comprising:
a tone control circuit generating an equal amplitude spectrum signal and transmitting the equal amplitude spectrum signal to the at least one movable driving electrode and the at least one stationary driving electrode to drive the proof mass to vibrate in order to make the at least one movable sensing electrode and the at least one stationary sensing electrode generate the sensing signal,
a finite impulse response filter electrically connected to the analog to digital converter, the finite impulse response filter transforms the input spectrum signal into an output spectrum signal according to a set of finite impulse response coefficients, and
a coefficient calculating element electrically connected to the finite impulse response filter, wherein the coefficient calculating element calculates the set of the finite impulse response coefficients according to the input spectrum signal and a target spectrum signal when the microelectromechanical sensor is subjected to an equal amplitude vibration, the coefficient calculating element transmits the set of the finite impulse response coefficients to the finite impulse response filter, and an amplitude at each frequency point of the target spectrum signal and another amplitude of the input spectrum signal at the each frequency point are reciprocal of each other.

16. The microelectromechanical sensing apparatus with calibration function according to claim 15, wherein the microelectromechanical sensor further comprises a heater electrically connected to the calibration module, and the heater maintains a temperature of the microelectromechanical sensing apparatus in a predetermined temperature range when the tone control circuit transmits the equal amplitude spectrum signal to the at least one movable driving electrode and the at least one stationary driving electrode.

17. The microelectromechanical sensing apparatus with calibration function according to claim 15, wherein microelectromechanical sensor further comprises a temperature sensor electrically connected to the calibration module, the temperature sensor is configured to sense an environmental temperature of the microelectromechanical sensing apparatus when the tone control circuit transmits the equal amplitude spectrum signal to the at least one movable driving electrode and the at least one stationary driving electrode, and outputs the environmental temperature to calibration module, and the calibration module stores the set of the finite impulse response coefficients and the environmental temperature.

18. The microelectromechanical sensing apparatus with calibration function according to claim 15, wherein the set of the finite impulse response coefficients is a plurality of sets of finite impulse response coefficients, the microelectromechanical sensor further comprises a temperature sensor configured to sense an environmental temperature of the microelectromechanical sensing apparatus, the temperature sensor outputs the environmental temperature to the calibration module, and the finite impulse response filter receives one of the sets of finite impulse response coefficients corresponding to the environmental temperature.

* * * * *